Figure 1:
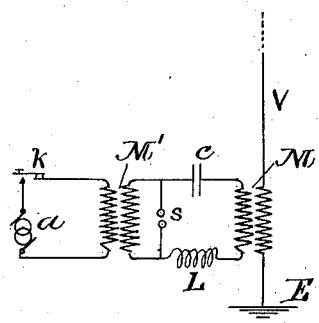

No. 717,514. Patented Dec. 30, 1902.
J. S. STONE.
APPARATUS FOR RELAYING SPACE TELEGRAPH SIGNALS.
(Application filed Jan. 23, 1901. Renewed Feb. 24, 1902.)
(No Model.)

WITNESSES:
Ellen B. Tomlinson
Philip J. Doherty

INVENTOR:
John Stone Stone.
by Alex P. Browne
attorney

UNITED STATES PATENT OFFICE.

JOHN STONE STONE, OF BOSTON, MASSACHUSETTS, ASSIGNOR TO LOUIS E. WHICHER, ALEXANDER P. BROWNE, AND BRAINERD T. JUDKINS, TRUSTEES.

APPARATUS FOR RELAYING SPACE-TELEGRAPH SIGNALS.

SPECIFICATION forming part of Letters Patent No. 717,514, dated December 30, 1902.

Application filed January 23, 1901. Renewed February 24, 1902. Serial No. 95,200. (No model.)

*To all whom it may concern:*

Be it known that I, JOHN STONE STONE, a citizen of the United States, residing at Boston, in the county of Suffolk and State of Massachusetts, have invented certain new and useful Improvements in Apparatus for Relaying Space-Telegraph Signals, of which the following is a specification.

My invention relates to the art of signaling electrically between stations not connected by a conducting-wire, sometimes called "space telegraphy," and more particularly to the type of space telegraphy in which the signals are transmitted by unguided electromagnetic waves. The distance to which it is at present practicable to signal by means of unguided electromagnetic waves is limited to distances considerably less than those usually communicated over by the ordinary telegraph and telephone of to-day. It is of the greatest importance, therefore, that suitable methods and means for automatically relaying space-telegraph signals be discovered and devised. So far as I am aware, no method or means for automatically relaying space-telegraph signals has heretofore been disclosed except such as depend for such efficiency as they may possess upon the use of a metallic screen as a material shield or barrier against the passage of the electromagnetic waves. Without considering in this connection the practical efficiency of such means it seems sufficient to point out that the present invention does not involve the idea of any material shield or barrier, but rather an electrical organization of the apparatus whereby the desired result may be obtained.

The object of the present invention is to provide apparatus whereby space-telegraph messages may be automatically relayed. This object I attain by receiving from the transmitting-station of a space-telegraph system the electromagnetic waves to be relayed in a suitable receiving device and by so associating with this receiving device a telegraphic relay operating the transmitting device of a second space-telegraph system that the signals emitted therefrom shall affect the receiving-station of said second system, but not the receiving device of the first system.

In a specific embodiment of the invention I employ a space-telegraph system comprising a transmitter and a receiver, the electromagnetic waves of which transmitter are in whole or in part of a simple harmonic character and of a fixed or predetermined frequency. These signal-waves are received by a receiver which is tuned to respond only to signal-waves of the frequency of those emitted by the said transmitter and which operates a relay which when set in motion in turn operates the transmitter of a second space-telegraph system, which transmitter is so tuned as to develop and transmit simple harmonic electromagnetic signal-waves of a different frequency from those emitted by the first transmitter. The electromagnetic signal-waves so transmitted are received in practice at a receiver-station, which in turn may be tuned to respond only to the signal-waves of the particular frequency developed by the said second transmitter.

In an application filed by me February 8, 1900, Serial No. 4,505, and subsequently divided a method and apparatus for tuning a transmitter so that it will transmit electromagnetic waves of but a single fixed frequency and in like manner tuning a receiver so that it will receive only electromagnetic signal-waves of a single fixed frequency are described and claimed, and the method and apparatus therein described are made use of in this specification to illustrate the present invention; but it is to be definitely understood that the present invention is not limited to such method or apparatus.

In the figures, $a$ represents a generator of vibratory currents of moderate frequency. $k$ is a key. R is a relay. T is an electric translating device. K' is a contact normally open, but closed by the relay R, Fig. 2, when the latter is set in motion. M, M', M'', and M''' are induction-coils or transformers. S is a spark-gap. C C' C'' C''' are condensers. L L' L'' are inductance-coils. V and V' are vertically-elevated conductors. E is an earth connection. K is a coherer, and B is a battery.

Figure 2:
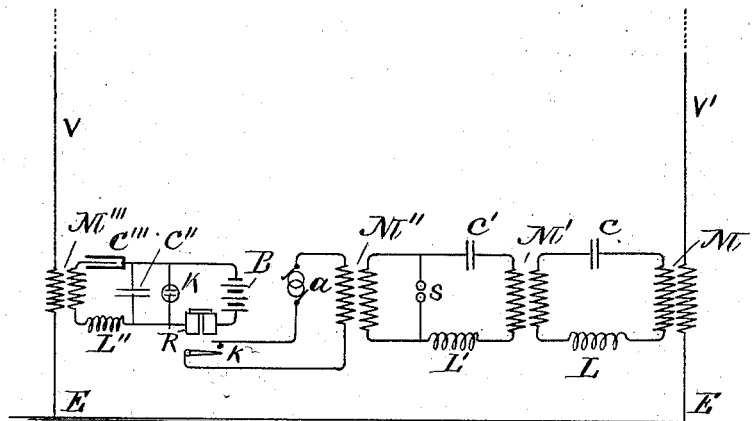

Figure 1 represents a transmitter so tuned that it will transmit electromagnetic signal-waves of practically but a single fixed frequency. Fig. 2 represents a receiver tuned to the same frequency as that of the transmitter of Fig. 1 and also in association therewith a second transmitter tuned to a different frequency. A relay R is so arranged as to be set in motion by the signals received at this receiver and when so set in motion to cause the said second transmitter to transmit corresponding signals to the receiver shown at Fig. 3. This receiver is preferably, though not necessarily, tuned to the same frequency as that of the second transmitter, with which it is associated.

Figure 3:
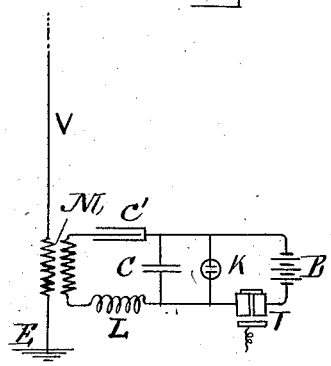

By means of the three apparatus shown in the drawings an operator at the transmitter shown at Fig. 1 may communicate with a second operator at the receiver shown at Fig. 3 through the intermediary of the apparatus shown at Fig. 2, even when the receiver shown at Fig. 3 is too remote from the transmitter shown at Fig. 1 for such communication to take place directly without relaying.

The construction and mode of operation of the transmitters and receivers shown in the drawings are described at length in the hereinbefore-mentioned application and need not, therefore, be further described here. Suffice it to say that when the operator at the transmitter shown in Fig. 1 depresses the key $k$ approximately simple harmonic electromagnetic waves of a fixed periodicity emanate from the vertical wire V of that station. These waves impinging upon the vertical wire V of the receiver depicted at Fig. 2 develop therein electric vibrations of a corresponding frequency, and the energy of these vibrations is conveyed through the intermediary of the induction-coil $M'''$ to a resonant electric circuit $C''' C'' L''$, attuned to the same frequency as that of the said vibrations. By virtue of this resonance a high electromotive force is developed at the terminals of the condenser $C''$, and this electromotive force operates the coherer K, which sets in motion the relay R. This in turn causes the closure of the circuit of the generator $a$ at the contact-point $k'$. The closure of this circuit results in the production of a vibratory current in the resonant circuit $S C' L'$, which is approximately simple, harmonic in character, and of a different frequency from that to which the circuit $C''' C'' L''$ is attuned. The energy of these vibrations is conveyed through the intermediary of the induction-coil $M'$ to a second resonant circuit C L, which is attuned to the same frequency as the circuit $S C' L'$ and which tends to suppress any harmonics which may be contained in the vibrations developed in the circuit $S C' L'$. The energy of the vibrations in the circuit C L is conveyed through the intermediary of the induction-coil M to the elevated conductor V', in which are thereby developed simple harmonic vibrations of the frequency to which the circuits $S C' L'$ and $C' L$ are attuned. As a result of these electric vibrations in the vertical wire V' electromagnetic waves of a frequency corresponding to that of the vibrations are emitted from the vertical wire V', and these latter waves, impinging upon the vertical wire V of the receiver shown at Fig. 3, cause the electric translating device T of that station to be set in motion in a manner fully set forth in the application hereinbefore mentioned.

For the purpose of sending a series of signals a decoherer (not shown in the drawings) may be employed to restore the coherer shown at K in Fig. 2 and Fig. 3. The electromagnetic waves emanating from the vertical wire V', Fig. 2, do not affect the receiver device of that figure, because they are of a different frequency from that to which the resonant circuit $C''' C'' L''$ is attuned. Except the vertical wires V V', Fig. 2, be separated by a considerable distance by an extension of the circuit connecting $k'$ with $a$ it may be found necessary to interpose more than one resonant circuit between the vertical wire V, Fig. 2, and the coherer K, and similarly it may be found necessary to interpose several resonant circuits between the spark-gap S, Fig. 2, and the vertical wire V'. The manner in which this may be accomplished is fully described in the hereinbefore-mentioned two applications.

I claim—

In an apparatus for space-telegraph relaying, a space-telegraph system the receiver of which is tuned to a certain given frequency, a second space-telegraph system the transmitter of which is tuned to a different frequency, and a relay adapted when set in motion by the receiver of the first-named system to operate the transmitter of the second system.

JOHN STONE STONE.

In presence of—
ALEX. P. BROWNE,
ELLEN B. TOMLINSON.